United States Patent
Osiecki

(10) Patent No.: US 10,891,463 B2
(45) Date of Patent: Jan. 12, 2021

(54) SIGNATURE MATCH SYSTEM AND METHOD

(71) Applicant: THE BANK OF NEW YORK MELLON, New York, NY (US)

(72) Inventor: Marcin Osiecki, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 121 days.

(21) Appl. No.: 16/182,789

(22) Filed: Nov. 7, 2018

(65) Prior Publication Data

US 2020/0143143 A1 May 7, 2020

(51) Int. Cl.
 *G06K 9/00* (2006.01)
 *G06K 9/62* (2006.01)

(52) U.S. Cl.
 CPC ..... *G06K 9/00154* (2013.01); *G06K 9/00416* (2013.01); *G06K 9/6211* (2013.01); *G06K 2209/01* (2013.01)

(58) Field of Classification Search
 CPC ........................ G06K 9/00154; G06K 2209/01
 See application file for complete search history.

(56) References Cited

U.S. PATENT DOCUMENTS

| | | | |
|---|---|---|---|
| 5,042,073 A | 8/1991 | Collot et al. | |
| 5,909,500 A | 6/1999 | Moore | |
| 6,108,444 A | 8/2000 | Syeda-Mahmood | |
| 6,243,493 B1 | 6/2001 | Brown et al. | |
| 6,445,820 B1 | 9/2002 | Love | |
| 7,272,259 B2 | 9/2007 | Houle et al. | |
| 7,545,959 B2 | 6/2009 | Houle et al. | |
| 7,555,162 B2 | 6/2009 | Houle et al. | |
| 7,580,551 B1* | 8/2009 | Srihari | G06K 9/00161 340/5.52 |
| 7,599,528 B1 | 10/2009 | Chaurasia | |
| 7,724,958 B2 | 5/2010 | Walch | |
| 7,894,634 B2 | 2/2011 | Chung | |
| 7,925,062 B2 | 4/2011 | Arai | |
| 8,842,916 B2 | 9/2014 | Pollard et al. | |
| 9,384,518 B2 | 7/2016 | Chung | |
| 9,633,173 B2 | 4/2017 | Pauletto et al. | |
| 2007/0188793 A1 | 8/2007 | Wakai | |

(Continued)

OTHER PUBLICATIONS

Nagy, G., 1970. Normalization techniques for handprinted numerals. Communications of the ACM, 13(8), pp. 475-481.*

(Continued)

*Primary Examiner* — Zhitong Chen
(74) *Attorney, Agent, or Firm* — Pillsbury Winthrop Shaw Pittman, LLC

(57) ABSTRACT

The present disclosure relates to a system and method for matching a signature extracted from an electronic document (e.g., extracted as .jpg, .gif .png, etc.) with one or more other signatures. The system determines various signature attributes including a number of black pixels in the extracted image, the slopes of four different lines that bound the signature in the extracted image, and a normalized width to height ratio. Two (or more) signatures are considered a match if the attributes match to within specified tolerances. Individual attributes have their own tolerances. These tolerances are adjustable independent of the other tolerances for other attributes.

20 Claims, 8 Drawing Sheets

(56) References Cited

U.S. PATENT DOCUMENTS

| | | | |
|---|---|---|---|
| 2008/0253659 A1* | 10/2008 | Walch | G06K 9/46 |
| | | | 382/186 |
| 2009/0049534 A1* | 2/2009 | Chung | G06Q 10/10 |
| | | | 726/7 |
| 2014/0003675 A1 | 1/2014 | Li et al. | |

OTHER PUBLICATIONS

Tan, J., Jian-huang, L., Chang-dong, W. and Feng, M.S., 2011. A stroke shape and structure based approach for off-line chinese handwriting identification. International Journal of Intelligent Systems and Applications, 3(2), p. 1.*

Srikantan, Geetha, Stephen W. Lam, and Sargur N. Srihari. "Gradient-based contour encoding for character recognition." Pattern Recognition 29, No. 7 (1996): 1147-1160.*

Bhattacharya, Indrajit, Prabir Ghosh, and Swarup Biswas. "Offline signature verification using pixel matching technique." Procedia Technology 10 (2013): 970-977.

Dhawan, Ashish et al. "Handwritten signature verification." ECE533 Project Report (2004): 1-16.

Narkhede, Sangeeta G. et al. "Review of Feature Extraction Techniques for Offline Signature Verification." International Journal of Engineering Research & Technology 3, No. 2 (Feb. 2014): 1569-571. Accessed Sep. 20, 2018.

* cited by examiner

SIGNATURE MATCH SYSTEM AND METHOD

BACKGROUND OF THE INVENTION

1. Field of the Invention

The present disclosure relates to a system and method for matching signatures.

2. Description of Related Art

Signature matching systems are known. Typical systems determine one or more characteristics of a signature and compare those characteristics to corresponding characteristics of other signatures to determine a match. Signature matching systems often either determine only a limited number of characteristics of a signature for comparison, which may lead to low confidence in an identified match, or determine an exhaustive number of characteristics of a signature for comparison, which may require a large processing capacity and have other disadvantages.

SUMMARY OF EMBODIMENTS OF THE INVENTION

The following is a non-exhaustive listing of some aspects of the present techniques. These and other aspects are described in the following disclosure.

One aspect of the present disclosure relates to a method for matching signatures. The method comprises extracting, with one or more processors of a signature matching system, an electronic image of a signature from an electronic document. The method comprises determining, with the one or more processors of the signature matching system, using the extracted electronic image of the signature, values of slopes of lines that bound the signature in the electronic image. The method comprises comparing, with the one or more processors of the signature matching system, the values of the slopes of the lines that bound the signature in the electronic image to values of slopes of corresponding lines that bound other signatures stored in a signature database of the signature matching system. The method comprises determining, with the one or more processors of the signature matching system, whether the signature matches one or more of the other signatures based on the values of the slopes of the lines that bound the signature in the electronic image matching values of corresponding slopes of lines that bound one or more of the other signatures to within predetermined tolerances for the slopes.

In some embodiments, the slopes of the lines that bound the signature in the electronic image comprise four slopes of four lines that form a quadrilateral that bounds the signature in the electronic image. In some embodiments, the signature is matched to one or more of the other signatures responsive to the values of the four slopes of the signature matching values of four corresponding slopes of one or more of the other signatures to within predetermined tolerances for the four slopes. In some embodiments, at least one predetermined tolerance of the predetermined tolerances for the slopes is different from another tolerance such that a predetermined tolerance for a value of at least one slope is different from a predetermined tolerance for a value of another slope.

In some embodiments, the method further comprises determining, with the one or more processors of the signature matching system, using the extracted electronic image of the signature: a ratio of a number of black pixels in the signature to a total number of pixels in the electronic image; and a ratio of electronic image height to electronic image width. In some embodiments, the signature is determined to match one or more of the other signatures responsive to: the values of the slopes of the lines that bound the signature matching values of corresponding slopes of the lines that bound one or more of the other signatures to within predetermined tolerances for the slopes; the ratio of the number of black pixels in the signature to the total number of pixels in the electronic image matching corresponding pixel ratios of one or more of the other signatures to within a predetermined tolerance for the pixel ratio; and the ratio of electronic image height to electronic image width matching corresponding dimensional ratios of one or more of the other signatures to within a predetermined tolerance for the dimensional ratio.

In some embodiments, the method further comprises, responsive to extracting the electronic image of the signature from the electronic document, pre-processing the electronic image with the one or more processors of the signature matching system. The pre-processing comprises receiving a black and white electronic image of the signature, or converting a color electronic image of the signature to a black and white electronic image of the signature. The pre-processing comprises converting the black and white electronic image of the signature into a two dimensional binary matrix that stores a "1" in the matrix for a black pixel in the black and white electronic image and a "0" in the matrix for a white pixel in the black and white electronic image. The pre-processing comprises trimming the two dimensional binary matrix such that a left most "1" in the matrix is positioned on a left edge of the trimmed matrix, an upper most "1" in the matrix is positioned at an upper edge of the trimmed matrix, a right most "1" in the matrix is positioned at a right edge of the trimmed matrix, and a lower most "1" in the matrix is positioned at a lower edge of the trimmed matrix. The pre-processing comprises assigning, with the one or more processors of the signature matching system, Cartesian co-ordinates to the 1's and 0's in the trimmed matrix and determining values of four slopes of four lines that bound the signature using the Cartesian co-ordinates. The four lines comprise a line between the left most "1" and the upper most "1", a line between the upper most "1" and the right most "1", a line between the right most "1" and the lower most "1", and a line between the lower most "1" and the left most "1" of the trimmed matrix.

In some embodiments, the method comprises storing, with the one or more processors of the signature matching system, the determined values of the slopes of the signature in an object representing the electronic image of the signature. In some embodiments, the method comprises storing, with the one or more processors of the signature matching system, a unique identifier for the object, information related to the electronic document the electronic image of the signature was extracted from, metadata associated with the electronic image, information related to an image width, and information related to an image height in the object representing the electronic image of the signature.

In some embodiments, the predetermined tolerances for the values of individual slopes are independent of tolerances for values of other individual slopes and separately adjustable.

Another aspect of the present disclosure relates to a tangible, non-transitory, machine-readable medium of a signature matching system storing instructions that when executed by one or more processors effectuate operations comprising: extracting an electronic image of a signature from an electronic document; determining, using the extracted electronic image of the signature, values of slopes of lines that bound the signature in the electronic image; comparing the values of the slopes of the lines that bound the signature in the electronic image to values of slopes of corresponding lines that bound other signatures stored in a signature database of the signature matching system; and determining whether the signature matches one or more of the other signatures based on the values of the slopes of the lines that bound the signature in the electronic image matching values of corresponding slopes of lines that bound one or more of the other signatures to within predetermined tolerances for the slopes.

Another aspect of the present disclosure relates to a system for matching signatures. The system comprises one or more processors configured by machine-readable instructions and/or other components. The one or more processors are configured to: extract an electronic image of a signature from an electronic document; determine, using the extracted electronic image of the signature, values of slopes of lines that bound the signature in the electronic image; compare the values of the slopes of the lines that bound the signature in the electronic image to values of slopes of corresponding lines that bound other signatures stored in a signature database of the signature matching system; and determine whether the signature matches one or more of the other signatures based on the values of the slopes of the lines that bound the signature in the electronic image matching values of corresponding slopes of lines that bound one or more of the other signatures to within predetermined tolerances for the slopes.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

Signature matching is often a manual process used by banks (for example) and other institutions that includes multiple independent manual signature match verifications on client (for example) documents (e.g., faxes, PDF's, etc.). The manual processes requires humans to match a signature on a received document with a client signature from a master client document containing all signatures ever received from that client. This master document may change periodically, a signature match may be repeated multiple times by different people, and there is typically no measurement of the accuracy of a match. Instead, a match is often based on human opinion only. These manual processes have begun to be replaced by automated signature matching systems. However, typical signature matching systems often either determine only a limited number of characteristics of a signature for comparison, which may lead to low confidence in an identified match, or determine an exhaustive number of characteristics of a signature for comparison, which may require a large processing capacity, slow the signature matching process, and have other disadvantages.

Accordingly, there is an unmet need for an electronic signature matching system that determines and compares enough signature attributes to produce an accurate match between signatures, without over determining a number of attributes such that the system requires a prohibitively large or inefficient processing capacity.

Figure 1:
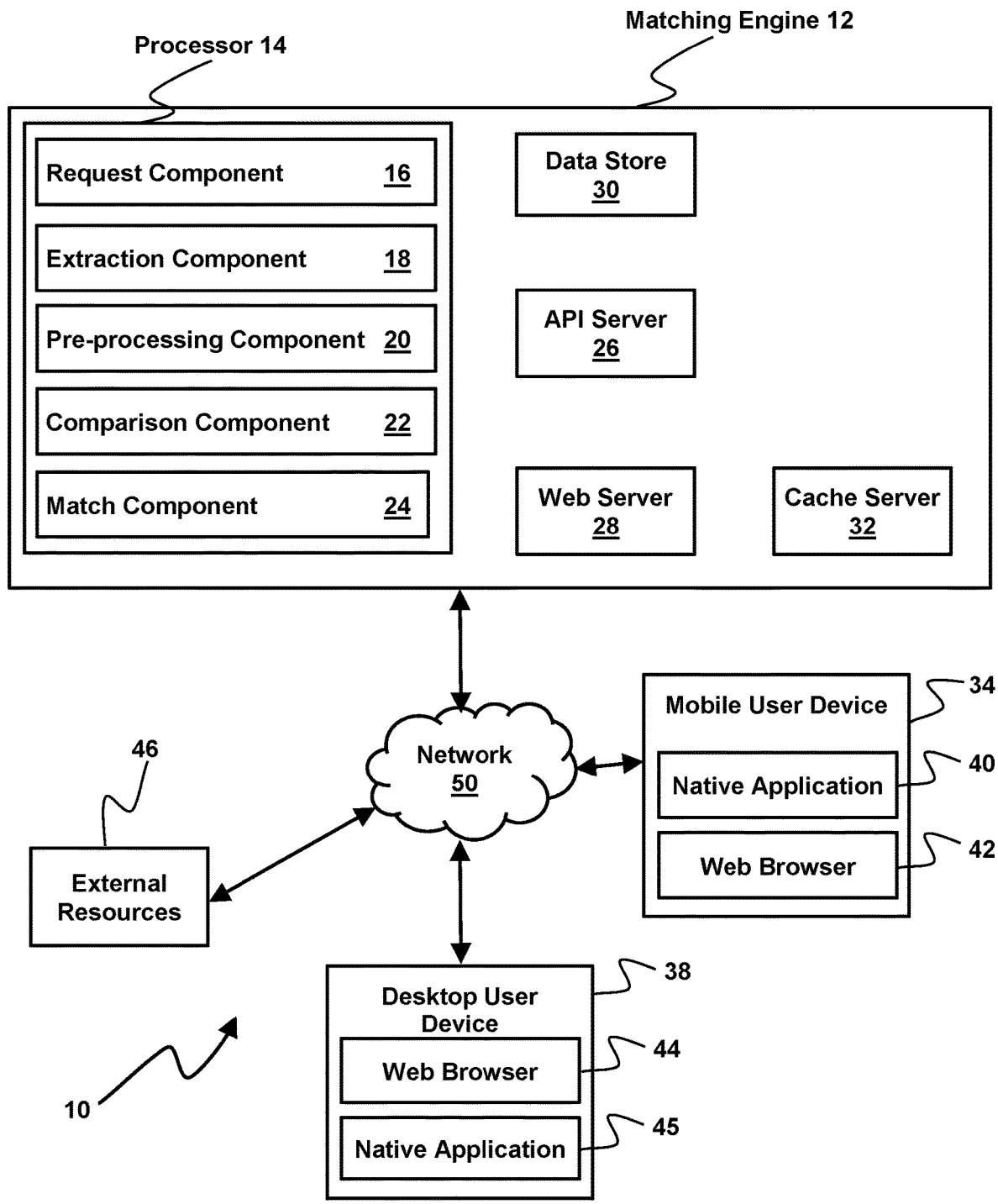
FIG. 1 illustrates a signature matching system, in accordance with one or more embodiments.

FIG. 1 illustrates such a signature matching system 10. System 10 is configured to electronically match a given signature to one or more other signatures in a signature database. System 10 is configured to determine a specific set of signature attributes of the given signature to corresponding attributes of other signatures in the signature database. The attributes determined by system 10 balance signature match accuracy with processing requirements and match determination speed. System 10 is configured to receive a request to match a signature in a document to one or more other signatures. System 10 is configured to extract an electronic image of the signature from the document that includes the signature and determine various attributes of the signature. The attributes include slopes of lines that bound the signature in the electronic image, a pixel ratio of colored pixels to total pixels in the image, a height to width ratio of the signature, and/or other attributes. System 10 is configured to compare these attributes of the signature to corresponding attributes of other signatures stored in the signature database, and determine whether the signature matches one or more of the other signatures based on the attributes of the signature matching values of the corresponding attributes of the other signatures to within predetermined tolerances for the attributes.

The operations performed by system 10 is are based at least in part on the fact that .pdf, .doc, .jpg, and/or other documents are generated by other systems and a signature presented in such a document is often an overlay of a previously saved picture of an actual signature. As such, attributes of these signatures do not vary as much as attributes of hand signed documents. Variation in these overlays of previously saved pictures of actual signatures is primarily related to the placement of the signature within a page (e.g., a signature may be shifted up, down, left, right), noise (e.g., random black dots) included in a signature, and a size of the signature (e.g., the overlay may be scaled up or down compared to some original image of a signature).

System 10 is configured such that, considering the information above, in order to match two signatures, a predefined set of image attributes may be determined. For any new image of a signature, system 10 is configured such that the same set of attributes may be determined and, responsive to a value of an attribute falling within a tolerance range for that attribute (determined based on prior signatures from the same signatory), the attribute may be considered "matched". If the remaining attributes from a signature match the attributes of one or more prior signatures from the same signatory, two signatures are considered a match. System 10 is configured such that, since individual attributes have their own tolerance, an overall indication of the quality of a match may also be determined (e.g., a weighted average of matches across individual attributes). System 10 is configured such that the information that two (or more) signatures match may then be used in a matching process for new arriving documents that include images of signatures. As described above, this process produces an accurate match between signatures, without over determining a number of attributes such that system 10 does not require a prohibitively large or inefficient processing capacity.

These and other benefits are described in greater detail below, after introducing the components of the system 10 and describing their operation. It should be noted, however, that not all embodiments necessarily provide all of the benefits outlined herein, and some embodiments may provide all or a subset of these benefits or different benefits, as various engineering and cost tradeoffs are envisioned, which is not to imply that other descriptions are limiting. In some embodiments, system 10 comprises a matching engine 12, mobile user devices 34, desktop user devices 38, external resources 46, a network 50, and/or other components.

Matching engine 12 is configured to receive a request to match a signature in an document to one or more other signatures; extract an electronic image of the signature from the document that includes the signature; determine various attributes of the signature (e.g., as described below); compare the attributes of the signature to corresponding attributes of other signatures stored in a signature database; and determine whether the signature matches one or more of the other signatures based on the attributes of the signature matching values of the corresponding attributes of the other signatures to within predetermined tolerances for the attributes. Matching engine 12 may be formed by a combination of hardware and/or software, and/or other components. In some embodiments, matching engine 12 includes a processor 14, an application program interface (API) server 26, a web server 28, a data store 30, a cache server 32, and/or other components.

Processor 14 is configured to coordinate the operation of the other components of matching engine 12 to provide the functionality described herein. Processor 14 is configured to provide information-processing capabilities in matching engine 12. As such, processor 14 may comprise one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some embodiments, processor 14 may comprise a plurality of processing units. These processing units may be physically located within the same device, or processor 14 may represent processing functionality of a plurality of devices operating in coordination. In some embodiments, processor 14 may be and/or be included in a computing device such as a desktop computer, a laptop computer, a smartphone, a tablet computer, a server, and/or other computing devices (e.g., as described below). Such computing devices may run one or more electronic applications having graphical user interfaces configured to facilitate user interaction with system 10.

As shown in FIG. 1, processor 14 is configured to execute one or more computer program components. The computer program components may comprise software programs and/or algorithms coded and/or otherwise embedded in processor 14, for example. The one or more computer program components may comprise one or more of a request component 16, an extraction component 18, a pre-processing component 20, a comparison component 22, a match component 24, and/or other components. Processor 14 may be configured to execute components 16, 18, 20, 22, and/or 24 by software; hardware; firmware; some combination of software, hardware, and/or firmware; and/or other mechanisms for configuring processing capabilities on processor 14.

It should be appreciated that although components 16, 18, 20, 22, and 24 are illustrated in FIG. 1 as being co-located in matching engine 12, one or more of the components 16, 18, 20, 22, or 24 may be located remotely from the other components. The description of the functionality provided by the different components 16, 18, 20, 22, or 24 described below is for illustrative purposes, and is not intended to be limiting, as any of the components 16, 18, 20, 22, and/or 24 may provide more or less functionality than is described, which is not to imply that other descriptions are limiting. For example, one or more of the components 16, 18, 20, 22, or 24 may be eliminated, and some or all of its functionality may be provided by others of the components 16, 18, 20, 22, or 24, again which is not to imply that other descriptions are limiting. As another example, processor 14 may include one or more additional components that may perform some or all of the functionality attributed below to one of the components 16, 18, 20, 22, or 24.

Request component 16 is configured to receive requests to match signatures. Request component 16 may receive a request to match a signature via a user interface of system 10, from a mobile user device 34, a desktop user device 38, and/or other computing devices. Request component 16 may receive requests as a result of entries and/or selections made by a user through a user interface, requests made by email, text, and/or other forms of communication, requests that correspond with document uploads and/or downloads, requests received over a network, and/or other requests. In some embodiments, a request identifies a signature and/or a document that includes a signature for matching. In some embodiments, a request may indicate that a signature is to be matched to one or more signatures in a signature database, or a request may indicate that a signature should be matched to one or more specific signatures provided and/or indicated by a user. For example, a typical request may be sent over HTTP protocol as a restful request, where the location of the new signature is passed as a parameter.

Extraction component 18 is configured to extract an image of a signature. The image of the signature is an electronic image of the signature from an electronic document. In some embodiments, the document may be a .pdf, .doc, .jpg, and/or other documents. In some embodiments, these documents are generated by other systems. In some embodiments, a signature in such a document extracted by extraction component 18 is an overlay of a previously saved picture of an actual signature. In some embodiments, extraction component 18 is configured to identify the placement of (or parameters related to the placement of) the signature within a page. For example, extraction component 18 may identify a top, bottom, left, right, etc. of a signature on a page and extract a corresponding portion of a document that includes the signature. In some embodiments, the image of the signature is extracted as a .jpg, a .gif, a .png, and/or other file types.

Pre-processing component 20 is configured to pre-process the image of the signature. In some embodiments, the pre-processing comprises receiving a black and white electronic image of the signature, or converting a color electronic image of the signature to a black and white electronic image of the signature. The pre-processing comprises converting a black and white electronic image of the signature into a two dimensional binary matrix. The two dimensional binary matrix stores a "1" in the matrix for a black pixel in the black and white electronic image and a "0" in the matrix for a white pixel in the black and white electronic image. For example, a .jpg image of the extracted signature may be converted into the two dimensional binary matrix that stores "1" for a black pixel in the image of the signature, and "0" for white space in the image of a signature.

For a color image of the signature, pre-processing component 20 is configured to determine what constitutes a "black" pixel compared to white space. In some embodiments, pre-processing component 20 may be configured to analyze individual pixels in the extracted image to determine RGB (red green blue) values for individual pixels. In some embodiments, pre-processing component 20 may be configured such that Java's ImageIO class, for example, may be used to determine RGB values for individual pixels. Pre-processing component 20 may compare an RGB value for a pixel to an RGB threshold for "black" pixels. For example, pre-processing component 20 may be configured such that a 255 RGB representation of single point in the image comprises a "black" pixel. In some embodiments, pre-processing component 20 uses a 150 RGB representation as a "grey" threshold (e.g., such that anything that breaches a 150 RGB representation is considered a "black" pixel. In some embodiments, pre-processing component 20 is configured such that the 225 RGB and/or 150 RGB representations are adjustable. For example, pre-processing component 20 may facilitate adjustment (e.g., of the Java code) via user entries and/or selections made via a user interface associated with system 10 (e.g., as described below) and/or by other methods. In some embodiments, these grayscale threshold determination operations need not be performed (e.g., such that the system determines what constitutes colored portions of the signature compared to white space).

In some embodiments, this type of grey scale representation may be a Digital 8-bit per channel representation, for example. In this format, "color" may be represented as triplet (255,0,0), or a single hexadecimal number (#FF0000). In a hexadecimal representation, the first two symbols (here FF) correspond to a first dimension, the next two symbols (00) correspond to a second dimension, and the last two symbols (00) correspond to third dimension. Comparing individual values in the triplet (for example) to a threshold determines if given pixel is represented as a 1 or 0.

Figure 2:
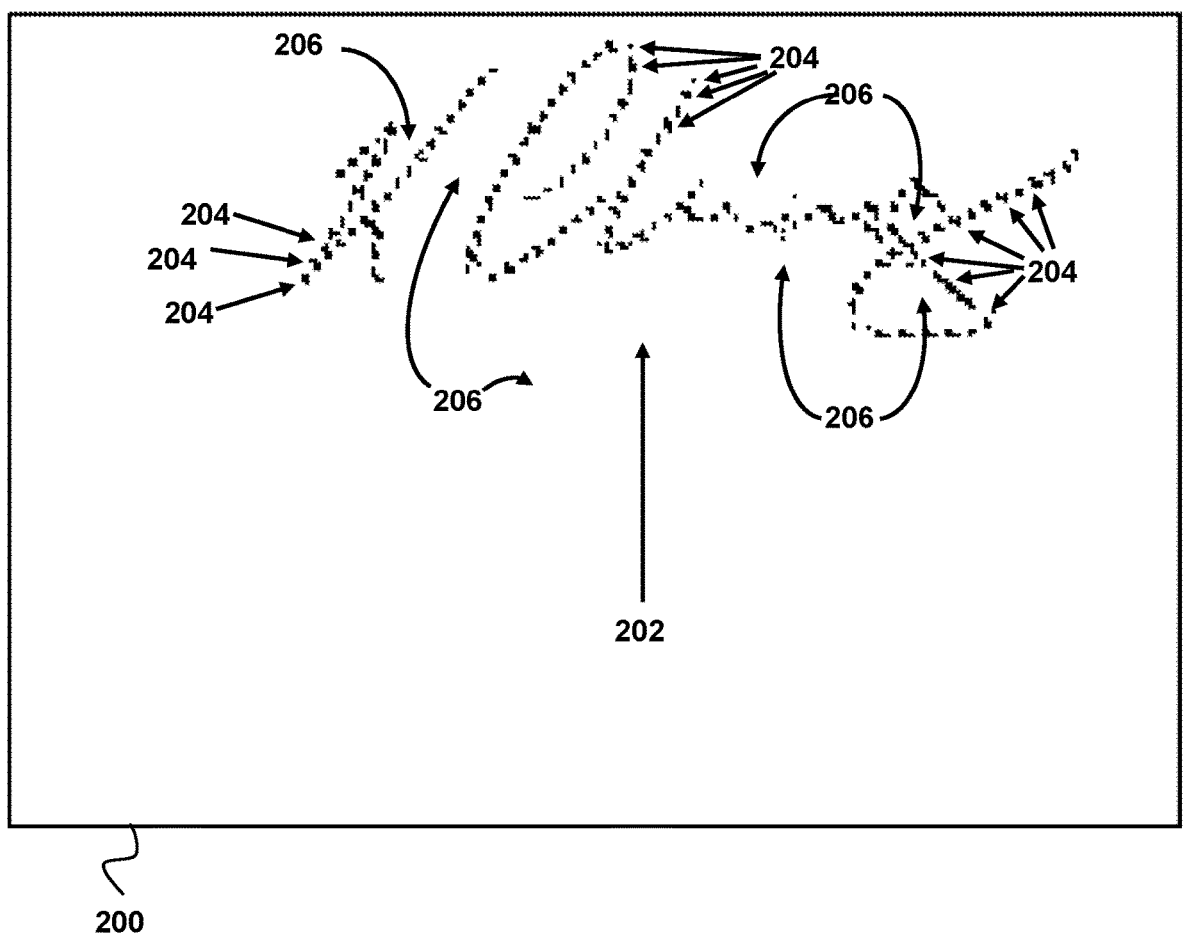
FIG. 2 illustrates an extracted image of a signature, in accordance with one or more embodiments.
Figure 3:
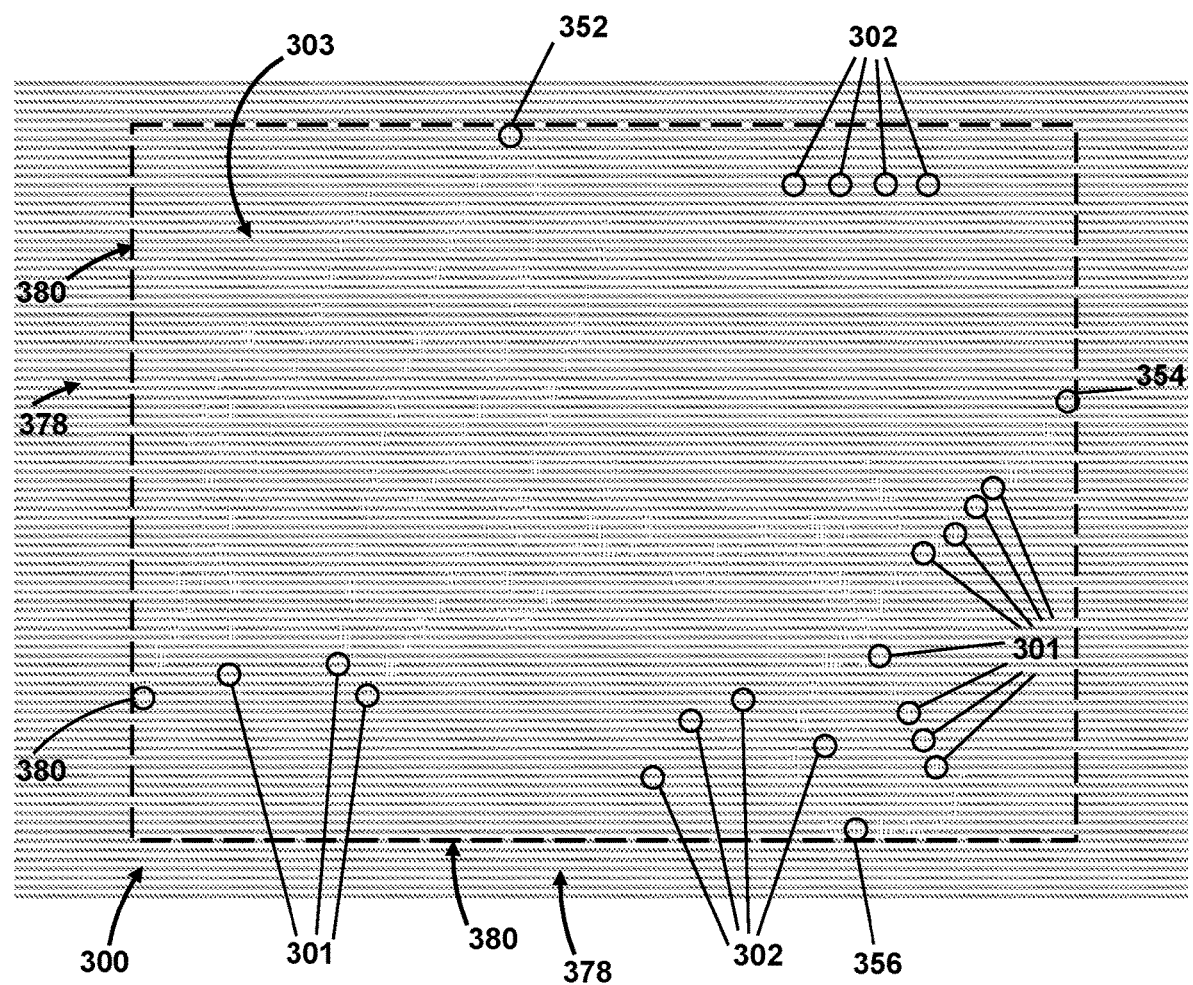
FIG. 3 illustrates a two dimensional binary matrix representative of the extracted image of the signature, in accordance with one or more embodiments.
Figure 4:
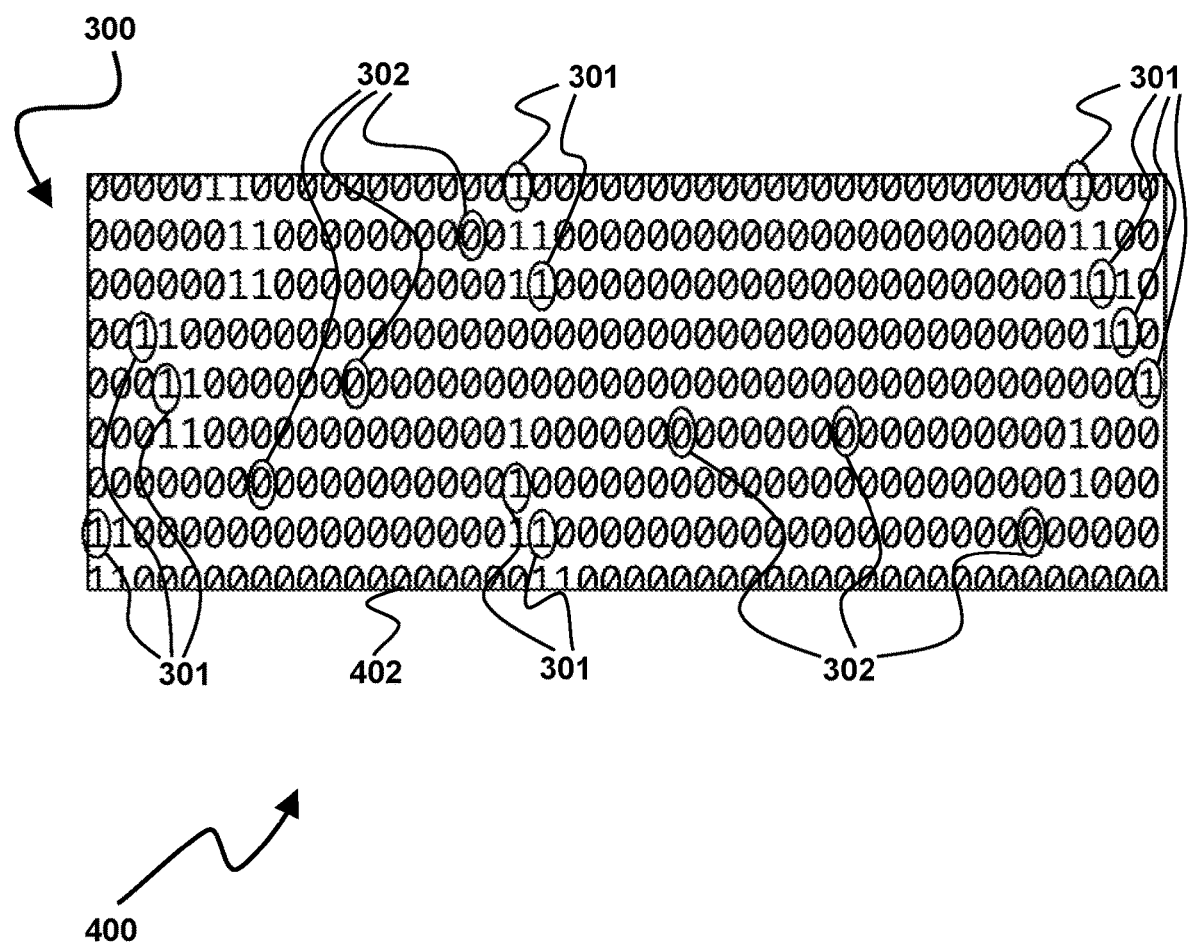
FIG. 4 is an enlarged view of a portion of the matrix, in accordance with one or more embodiments.

As an illustration, FIG. 2 illustrates an extracted image 200 of a signature 202. Extracted image 200 of signature 202 comprises black pixels 204 and white space 206. Extracted image 200 of signature 202 was either received by pre-processing component 20 as a black and white image, or converted to a black and white image using the operations described above. FIG. 3 illustrates a two dimensional binary matrix 300. Binary matrix 300 is a conversion of black and white electronic image 200 of signature 202 from FIG. 2 into two dimensional binary matrix 300. Two dimensional binary matrix 300 stores a "1" 301 in the matrix for a black pixel in black and white electronic image 200 (FIG. 2) and a "0" 302 in matrix 300 for a white pixel in black and white electronic image 200. The extracted signature is visible as an outline 303 of 1's in matrix 300 in FIG. 3. FIG. 4 is an enlarged view 400 of a portion 402 of matrix 300. As shown in FIG. 4, two dimensional binary matrix 300 stores a "1" 301 in the matrix for a black pixel in black and white electronic image 200 (FIG. 2) and a "0" 302 in matrix 300 for a white pixel in black and white electronic image 200.

Returning to FIG. 3, pre-processing component 20 (FIG. 1) is configured such that pre-processing comprises trimming two dimensional binary matrix 300. Pre-processing component 20 is configured to identify the outermost points of the signature (e.g., outline 303) in matrix 300. In some embodiments, pre-processing component 20 is configured to identify four outermost points of the signature (outline 303). Pre-processing component 20 is configured to trim or eliminate portions of matrix 300 (e.g., the 0's) that lie beyond these outermost points. In some embodiments, trimming or eliminating these portions of matrix 300 comprises trimming or eliminating portions 378 of matrix 300 that lie outside a signature area 380. In some embodiments, the four outermost points correspond to four edges of the signature (outline 303). Pre-processing component 20 is configured such that a left most "1" 350 in the matrix is positioned on a left edge of the trimmed matrix, an upper most "1" 352 in the matrix is positioned at an upper edge of the trimmed matrix, a right most "1" 354 in the matrix is positioned at a right edge of the trimmed matrix, and a lower most "1" 356 in the matrix is positioned at a lower edge of the trimmed matrix.

Figure 5:
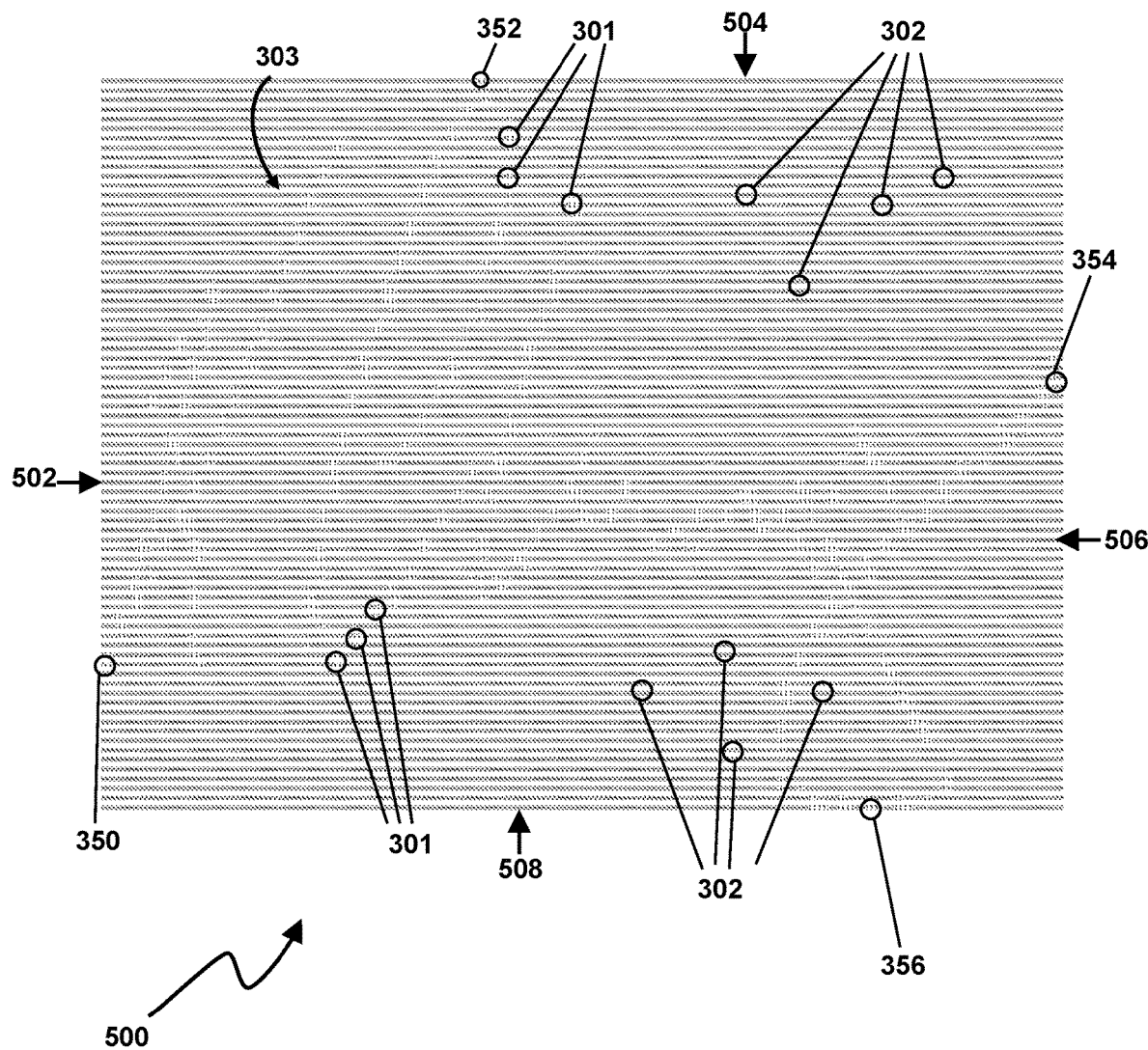
FIG. 5 illustrates a trimmed matrix, in accordance with one or more embodiments.

As an example, a trimmed matrix 500 is illustrated in FIG. 5. As shown in FIG. 5, a left most "1" 350 in the matrix is positioned on a left edge 502 of trimmed matrix 500, an upper most "1" 352 in the matrix is positioned at an upper edge 504 of trimmed matrix 500, a right most "1" 354 in the matrix is positioned at a right edge 506 of trimmed matrix 500, and a lower most "1" 356 in the matrix is positioned at a lower edge 508 of trimmed matrix 500. It should be noted that the terms "left", "upper", "right", and "lower" are not intended to be limiting. In the example shown in FIG. 5, these are merely used to orient the reader. The applicant contemplates that the image shown in FIG. 5 could be rotated 90 or 180 degrees for example, such that the left, upper, right, and lower, edges of the trimmed matrix 500 change accordingly, but the principles of the analysis performed by pre-processing component 20 (FIG. 1) (and the other processor components described herein) remain the same.

Pre-processing component 20 (FIG. 1) is configured such that the pre-processing comprises assigning Cartesian co-ordinates to the 1's and 0's in trimmed matrix 500. For example, pre-processing component 20 may assign a top left (these terms are not intended to be limiting) black pixel (a pixel 204 shown in FIG. 2) in the extracted image of the signature to a (0,0) position of the Cartesian coordinates. Similarly, a bottom right (these terms are not intended to be limiting) pixel is assigned a corresponding (x,y) coordinate position such that the values x, y represent a size of trimmed matrix 500 (e.g., a width of x units and a height of y units). Pre-processing component 20 is configured such that other pixels (black and white) of the image of the signature represented in trimmed matrix 500 have other corresponding x, y coordinates (e.g., x coordinates between zero and x, and y coordinates between zero and y in this example). It should be noted that other coordinate systems and/or techniques to assign unique coordinate positions to the 1's and 0's in trimmed matrix 500 are contemplated.

In some embodiments, pre-processing component 20 (FIG. 1) is configured to store the information in individual rows of trimmed matrix 500 (e.g., 1's and 0's representative of black and white pixels in image 200 (FIG. 2)) as BitSet vectors and/or in other formats. These vectors may be stored in data store 30 and/or in other locations. By way of a non-limiting example, BitSet is a data structure provided by the Java API. BitSet facilitates manipulation of, and deter-minations using, individual bits (representative of pixels in the signature) in a given vector. In some embodiments, BitSet may be used instead of other data structures because of BitSet's memory footprint and/or other advantageous features. For example, for storing information in binary format (e.g., 0,1) BitSet has a lower memory footprint compared to ArrayList or LinkedList (Java built in List implementation). However, in some embodiments, other data structures may be used to replace BitSet. In some embodiments, any implementation of a "List" interface can be used.

Returning to FIG. 1, comparison component 22 is con-figured to determine and compare attributes of extracted electronic image 200 (FIG. 2) of signature 202 (FIG. 2) to corresponding attributes of other signatures. The other sig-natures may be stored in an electronic signature database (data store 30 and/or external resources 46 shown in FIG. 1) and/or in other locations. In some embodiments, comparison component 22 is configured to determine individual attri-butes separately and/or in parallel to decrease processing time. Comparison component 22 is configured to determine the attributes based on trimmed matrix 500 (FIG. 5), the Cartesian coordinates assigned to trimmed matrix 500, and/or other information. Attributes of image 200 of extracted signature 202 determined by comparison component 22 include slopes associated with the signature, a ratio of black pixels to total pixels in the extracted image, a ratio of electronic image height to electronic image width, and/or other attributes.

Comparison component 22 is configured to determine, using trimmed matrix 500 (FIG. 5) (determined based on the extracted and pre-processed image 200 of signature 202 shown in FIG. 2), values of slopes of lines that bound signature 202 in electronic image 200. In some embodi-ments, the slopes of the lines that bound signature 202 in electronic image 200 comprise four slopes of four lines that form a quadrilateral that bounds signature 202 in electronic image 200. Comparison component 22 is configured to determine the values of the four slopes of the four lines that bound signature 202 using trimmed matrix 500 and the Cartesian co-ordinates described above, and/or other infor-mation. In some embodiments, comparison component 22 is configured to determine the equations (y=m(x)+b) of the four lines using the assigned Cartesian coordinates and outermost points 350, 352, 354, and 356 (FIG. 5). In some embodiments, comparison component 22 is configured to determine distances between points 350, 352, 354, and/or 356 using the Cartesian coordinates and/or other informa-tion. In some embodiments, comparison component 22 is configured to determine the values of the slopes of the lines that bound the signature based on the equations of the lines, the distances between points (e.g., rises over runs using the coordinate system) 350, 352, 354, and/or 356, and/or other information.

Figure 6:
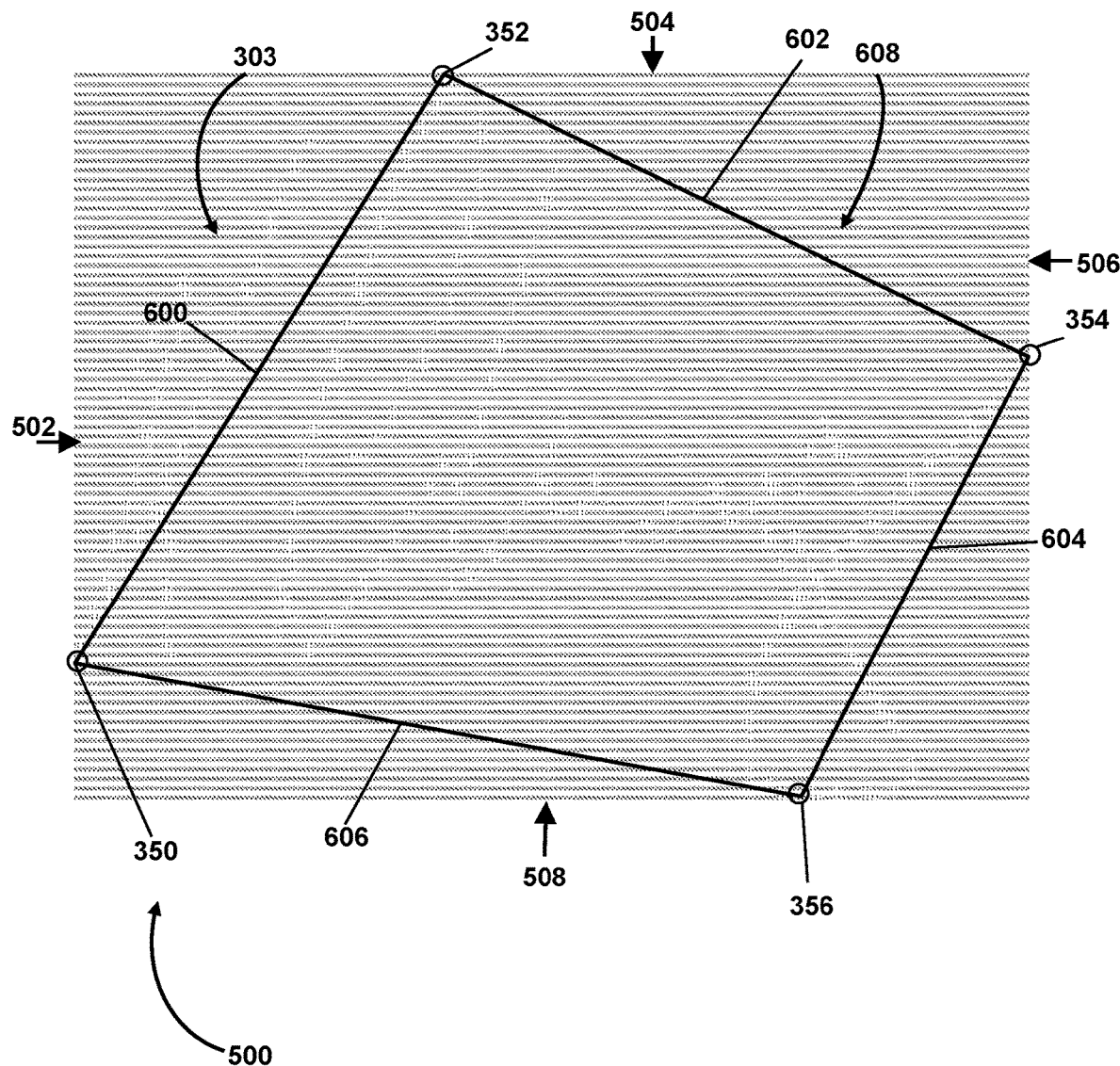
FIG. 6 illustrates four lines that bound an outline of the signature in the trimmed matrix, in accordance with one or more embodiments.

As an example, FIG. 6 illustrates four lines 600, 602, 604, and 606 that bound outline 303 of signature 202 (FIG. 2) in trimmed matrix 500. Lines 600, 602, 604, and 606 form a quadrilateral 608 that bounds outline 303 of signature 202. The four lines comprise a line 600 between the left most "1" 350 and the upper most "1" 352, a line 602 between the upper most "1" 352 and the right most "1" 354, a line 604 between the right most "1" 354 and the lower most "1" 356, and a line 606 between the lower most "1" 356 and the left most "1" 350 of trimmed matrix 500. In some embodiments, determination of points 350, 352, 354, and 356 (the vertexes of the quadrilateral) is done by iterating through rows in the BitSet converted and trimmed pixel matrix 500. Point 352 may be set as position (x, 0) where x is determined by the location of the first (from edge 502) non-zero bit in the Row 0 BitSet. Point 354 may be determined by iterating through the BitSet rows and finding the first one that has a 1 at a last (e.g., a farthest to the right) position (e.g., at edge 506) in trimmed matrix 500. Point 356 may be determined by finding the first non-zero bit in the lower most row (edge 508) of the BitSet. Point 350 may be found by iterating through the BitSet rows and determining the first row that has 1 in position 0.

For example, since trimmed matrix 500 is represented as a List of BitSet objects, to find the first row that contains 1 in position zero, comparison component 22 (FIG. 1) may iterate through the List, one row at a time and check to determine whether the BitSet object in the current row has 1 (bit) set in index 0. This may be performed using a utility function provided by the BitSet class. By way of a non-limiting example, the function used may be get(int index). For points 352, 354 and 356, for example, where the system needs to find the first occurrence of bit in given BitSet (a BitSet object is equivalent of a row of data points), next-SetBit(int fromIndex) may be used where fromIndex is set to 0—i.e., the beginning of the row).

As described above, in some embodiments, comparison component 22 (FIG. 1) is configured to determine the equations (y=m(x)+b) of the four lines using the assigned Cartesian coordinates and outermost points 350, 352, 354, and 356 (FIG. 5). In some embodiments, comparison com-ponent 22 is configured to determine distances between points 350, 352, 354, and/or 356 using the Cartesian coor-dinates and/or other information. In some embodiments, comparison component 22 is configured to determine the values of the slopes of the lines that bound the signature based on the equations of the lines, the distances between points (e.g., rises over runs using the coordinate system) 350, 352, 354, and/or 356, and/or other information. In some embodiments, the slopes of lines 600, 602, 604, and 606 are determined by comparison component 22 by the known formula for calculating the slope of the straight line between two points (e.g., rise over run): (yB−yA)/(xB−xA), where yB is the y coordinate of a point B, yA is the y coordinate of a point A, xB is the x coordinate of point B, and xA is the x coordinate of point Returning to FIG. 1, in some embodiments, comparison component 22 is configured to determine, using the extracted electronic image (e.g., image 200 shown in FIG. 2) of the signature (e.g., signature 202 shown in FIG. 2), a ratio of black pixels in the image to a total number of (black plus white) pixels in the image. As described above, the extracted electronic image of the signature is represented by (after pre-processing) trimmed matrix 500 shown in FIG. 5. Comparison component 22 is configured to determine the ratio of the number of black pixels in the signature to the total number of pixels in the electronic image using the 1's and 0's in trimmed matrix 500. Generally, comparison component 22 may count the total number of 1's in trimmed matrix 500 (e.g., which correspond to black pixels in the signature), count the total number of 0's in trimmed matrix 500, and divide the total number of 1's by the total number of 1's plus 0's. For example, comparison component 22 may iterate over BitSet rows and determine cardinalities of individual rows. Cardinality represents a total number of "black" pixels in a row (e.g., 1's in trimmed matrix 500). Since the total number of rows and total number of bits in a row is known (see trimmed matrix 500), overall cardinality may be determined by summing the cardinality of each individual row.

In some embodiments, comparison component 22 is configured to determine, using the extracted electronic image of the signature (e.g., trimmed matrix 500 shown in FIG. 5), a ratio of electronic image (image 200 shown in FIG. 2) height to electronic image width. For example, after image 200 is converted and trimmed (described in the pre-processing steps above) the height of the converted and trimmed image corresponds to the total number of rows in trimmed matrix 500. The width of image 200 corresponds to the total number of 1's and 0's within any single row of trimmed matrix 500. Since a row is stored as a BitSet object, comparison component 22 may determine the length of any such row (and thus the width of the image) using the command "BitSet.getSize( )", for example.

In some embodiments, comparison component 22 is configured to store the determined values of the slopes of the signature, the pixel ratio, the dimensional ratio, and/or other information in an object representing the electronic image of the signature. The object may be stored in data store 30, for example, and/or other storage components. In some embodiments, this includes storing a unique identifier for the object, information related to the electronic document the electronic image of the signature was extracted from, metadata associated with the electronic image, information related to an image width, information related to an image height in the object representing the electronic image of the signature, and/or other information.

By way of a non-limiting example, comparison component 22 may be configured to store, in the image information object, a string unique identifier (e.g., "String UniqueID"). This may be used by system 10 to uniquely identify individual "image info" (image information) objects. A unique identifier for individual image information objects facilitates easier storage of previously determined results (described herein). Comparison component 22 may be configured to store, in the image information object, information about original image 200 ("File originalFile"). Comparison component 22 may be configured to store, in the image information object, a two dimensional matrix of pixels where each entry in a list represents a row of data (e.g., "List<BitSet> pixels"). Comparison component 22 may be configured to store, in the image information object, information about each computed metadata item ("Map<String, Double> metadata"). The pixel ratio, dimensional ratio, and the slopes may be named and/or stored as PIXELS_RATIO, SHAPE_RATIO, SLOPE_A, SLOPE_B, SLOPE_C, and/or SLOPE_D, for example. Comparison component 22 may be configured to store, in the image information object, the trimmed width of matrix 500 (FIG. 5) ("int width"—determined by eliminating all 0 bits after left and right most points in trimmed matrix 500). Comparison component 22 may be configured to store, in the image information object, the trimmed height of matrix 500 (FIG. 5) ("int height"—determined by eliminating all 0 bits after bottom and top most points in timed matrix 500). These examples are not intended to be limiting.

Comparison component 22 is configured such that the determined slopes are compared to corresponding slopes of other signatures. Comparison component 22 is configured to compare the values of the slopes of the lines (600, 602, 604, and 606 shown in FIG. 6) that bound signature (e.g., 202 shown in FIG. 2) in the electronic image (e.g., 200 shown in FIG. 2) to values of slopes of corresponding lines that bound other signatures stored in a signature database. Comparison component 22 is configured to compare the value of the pixel ratio to pixel ratios of other signatures, the dimensional ratio of the signature to dimensional ratios of other signatures stored in the signature database, and/or compare other signature attributes.

Match component 24 is configured to determine a signature match. Match component 24 is configured to determine whether signature 202 (FIG. 2) matches one or more of the other signatures based on the values of the slopes of the lines (600, 602, 604, and 606 shown in FIG. 6) that bound the signature (e.g., 202 shown in FIG. 2) in the electronic image (e.g., 200 shown in FIG. 2) matching values of corresponding slopes of lines that bound one or more of the other signatures to within predetermined tolerances for the slopes. For example, signature 202 is matched to one or more of the other signatures responsive to the values of the four slopes of signature 202 (of lines 600-606) matching values of four corresponding slopes of one or more of the other signatures to within predetermined tolerances for the four slopes. In some embodiments, signature 202 is determined to match one or more of the other signatures responsive to the values of the slopes of the lines 600-606 that bound signature 202 matching values of corresponding slopes of the lines that bound one or more of the other signatures to within predetermined tolerances for the slopes; the ratio of the number of black pixels in signature 202 to the total number of pixels in electronic image 200 (FIG. 2) matching corresponding pixel ratios of one or more of the other signatures to within a predetermined tolerance for the pixel ratio; and the ratio of electronic image height to electronic image width matching corresponding dimensional ratios of one or more of the other signatures to within a predetermined tolerance for the dimensional ratio.

In some embodiments, match component 24 is configured to analyze individual attributes separately, determining possible matching signatures based on the tolerance for a given attribute. For example, match component 24 may be configured to determine a first set of possible matching signatures based on the value of a Slope A for line 600 and the tolerance for Slope A. Match component 24 may be configured to determine a second set of possible matching signatures based on the value of a Slope B for line 602 and the tolerance for Slope B. Match component 24 is configured to determine a signature match responsive to the same possible matching signature appearing in both the possible matches for Slope A (the matching signature has a slope that matches Slope A to within the specified tolerance for Slope A) and the possible matches for Slope B (the matching signature also has a slope that matches Slope B to within the specified tolerance for Slope B). This example extends to third and fourth slopes C and D, the pixel ratio, and the dimensional/shape ratio described above (e.g., such that match component 24 is configured to determine a signature match responsive to the matching signature appearing in possible matches for each attribute).

In some embodiments, match component 24 is configured such that at least one predetermined tolerance of the predetermined tolerances for the slopes, the pixel ratio, and/or the dimensional/shape ratio is different than another tolerance such that a predetermined tolerance for a value of at least one slope, the pixel ratio, and/or the dimensional/shape ratio is different than a predetermined tolerance for a value of another slope, the pixel ratio, and/or the dimensional/shape ratio. In some embodiments, the predetermined tolerances for the values of individual slopes, the pixel ratio, and/or the dimensional/shape ratio are independent of tolerances for values of other individual slopes, the pixel ratio, and/or the dimensional/shape ratio, and separately adjustable. In some embodiments, the tolerances for the individual attributes are determined at manufacture of system 10, determined based on information from known matched signatures, iteratively adjusted based on prior signature matches, and/or determined or adjusted in other ways.

In some embodiments, match component 24 is configured such that setting tolerance levels is based on a criticality of a business function where signature matching is used, noise levels on the incoming signature, and/or other factors related to where this signature matching system and method is used. In some embodiments, a default tolerance value (e.g., programmed at manufacture of the present system) may be no higher than about 5% of the value of a corresponding attribute. Values lower than 0.5% may also preclude the system from successfully identifying potential matches. For example if the value of attribute A in the original signature was determined to be 100, the candidate signature should have the same attribute evaluated to a value between 95-105 (e.g., max tolerance of 5%).

In some embodiments, levels of these tolerances (e.g., about 0.5%-5%) may be determined based on a visual comparison of saved images and/or other information. For example, stored images may be visually compared to each other to determine visual matches. Metadata for these matched images (e.g., values of image attributes attribute) may be collected and analyzed (e.g., average, standard deviation, etc.), and a tolerance for a corresponding attribute may be adjusted based on the analysis and/or other information. This example should not be considered limiting. Other methods to determine tolerance levels are contemplated.

EXAMPLE

By way of a non-limiting example, previously determined "image info" (e.g., as described above) for signatures associated with prior signature match requests may be stored (e.g., by pre-processing component 20 and/or comparison component 22 (and/or information for other signatures may be stored) in data store 30 shown in FIG. 1) so that metadata items (e.g., attributes such as Slopes, A, B, C, and D; Pixel Ratio, Dimensional/Shape Ratio, etc.) may be compared with corresponding attributes of new signatures in new images (e.g., a signature associated with a new signature match request). In some embodiments, these attributes may be stored as a map such that various techniques may be used to store these attributes. Processor 14 (FIG. 1) is configured to use a caching API where an individual attribute (e.g., slope A, B, C, D; pixel ratio; dimensional ratio; etc.) is stored in its own cache. Processor 14 may be configured such that the value of an attribute becomes the key of the cache and the unique image object identifier is the value. This initial lookup may facilitate quick identification if there exist any previously determined attributes within specified tolerances. A complete image info object is also stored to provide a reference to an original image file or document. For example, a pixel ratio attribute may be stored as:

| PIXEL_RATIO_CACHE | |
|---|---|
| 45 | 5efc7d4f-c571-477f-b65c-0bdfc6db070e |
| 66 | c6b75a51-615e-4263-8169-3e492b45ab00 |
| 72 | 911d8737-b181-4222-b8b0-06c6b4b2ef91 |

The first entry in the left column represents a signature image where 45% of the pixels are non-zero (black). This entry points to image info with the unique key of "5efc7d4f-c571-477f-b65c-0bdfc6db070e". If a new image is analyzed as described above by processor 14 and its pixel ratio is 47%, then a matching signature may be determined by performing a maximum of 6 cache lookups, for example. Assuming a tolerance for this attribute (pixel ratio) is set to 2%, then processor 14 (match component 24) would only have to determine whether there are entries in the cache that have +/−2 keys (49, 48, 47, 45, 44, 43). A pixel ratio of 45 would be considered a perfect match. Once potential matches for the new signature are found (e.g., based on the 2% tolerance for the pixel ratio), the same process may be repeated for the other attributes (e.g., Slope A, B, C, D; dimensional/shape ratio) and a final list of image info candidates (e.g., candidates that have pixel ratios within the specified tolerance for the pixel ratio, slope values within the specified tolerances for the individual slopes, and dimensional/shape ratios within the specified tolerances for the dimensional/shape ratio) may be determined. Continuing using the dimensional/shape ratio and Slope A in this example:

| SHAPE_RATIO_CACHE | |
|---|---|
| 8 | 5efc7d4f-c571-477f-b65c-0bdfc6db070e |
| 12 | c6b75a51-615e-4263-8169-3e492b45ab00 |
| 19 | 911d8737-b181-4222-b8b0-06c6b4b2ef91 |

| SLOPE_A_CACHE | |
|---|---|
| 6 | 5efc7d4f-c571-477f-b65c-0bdfc6db070e |
| 12 | c6b75a51-615e-4263-8169-3e492b45ab00 |
| 13 | 911d8737-b181-4222-b8b0-06c6b4b2ef91 |

Processor 14 (e.g., match component 24) is configured to determine lists of candidates with attribute values within some tolerance for individual attributes (pixel ratio, dimensional/shape ratio, and slope A in this example). A match is determined based on the intersection of candidate lists for the individual attributes (e.g., an image object with a pixel ratio within the specified pixel ratio tolerance, a dimensional/shape ratio within the specified dimensional/shape ratio tolerance, and a slope A value with the specified tolerance for slope A). If no image objects that meet all three requirements in this example exist, then a signature has no match.

As a simplified example (separate from the tables above) considering only two attributes, assume pixel ratio match candidates include 5efc7d4f-c571-477f-b65c-0bdfc6db070e, f78580e2-faee-4f14-8c07-f16139f3dd36, and 440f3b3b-98f7-432c-91c6-7737e83ae25d. Also assume dimensional/shape ratio match candidates include 440f3b3b-98f7-432c-91c6-7737e83ae25d, and 218345b3-ae41-4811-993c-eb86692f4a71. Image object 440f3b3b-98f7-432c-91c6-7737e83ae25d appears in both candidate lists, so there is a signature match for the signature associated with image object 440f3b3b-98f7-432c-91c6-7737e83ae25d. In some embodiments, match component 24 may determine the intersection of different candidate information objects for the individual attributes using CommonUtils from the Apache library, and/or other programming instructions.

Once a match is determined, details of a baseline image associated with the matched signature may be extracted from separate cache (for example):

| IMAGE_INFO_CACHE | |
|---|---|
| 5efc7d4f-c571-477f-b65c-0bdfc6db070e | {image_info_object1} |
| c6b75a51-615e-4263-8169-3e492b45ab00 | {image_info_object2} |
| 911d8737-b181-4222-b8b0-06c6b4b2ef91 | {image_info_object3} |

The image info cache may store a complete image info object with a unique id (e.g., as described above).

Continuing with FIG. 1, in some embodiments, match component 24 may be configured to output an indication of a match for display by a desktop user device 38, a mobile user device 34, and/or other computing systems. In some embodiments, the indication may be a matching score determined based on agreement between values of the attributes of signature 202 (FIG. 2) and the one or more matching signatures. In some embodiments, the indication may include information related to one or more portions of the analysis described in the Example above, and/or other information. In some embodiments, the indication may be reviewed by a user to verify a match between the one or more signatures. In some embodiments, the indication is an overall indication of the quality of a match. For example, the indication may be, or may be related to a weighted average of matches across individual attributes.

By way of a non-limiting example, match component 24 may be configured such that output from the system comprises: a yes or no indication of whether one signature matches another (e.g., Match Result(Boolean): Y/N), an indication that a signature has been stored by the system, an identification of the matching signature(s) (e.g., Original Signature ID(String): Original signature matched), information related to individual matched signature attributes (e.g., Attribute Info(Map): List of attributes that where matched), and/or other information. In some embodiments, the output from the system includes a name of the attribute(s) matched, and a corresponding value of the level of the match(es). Since each attribute can have a different tolerance level (described above), the system is configured such that signatures can match even if the values for individual attributes are different, but only by some small variance. Exposing that information to a user of the system may provide additional confidence about the logic applied. For example, if the result contains Attribute A—matching at >97% confidence (within a 3% tolerance), Attribute B—matching at >99% (within a 1% tolerance), and Attribute C—matching at >96% confidence (within a 4% tolerance), with an overall indication of a match as some other indicator "Y", then the user can still decide to perform manual match or take some other action based on the values for the matches of Attribute A, B, and/or C. In some embodiments, match component 24 may be configured such that output from the system includes a separate indication if there is a perfect match between any two or more signatures (e.g., PerfectMatch(Boolean): Y/N). In essence, the system may flag signatures where all attributes were matched at 100%.

In some embodiments, matching engine 12 is executed by one or more of the computers described below with reference to FIG. 7. The components of matching engine 12, in some embodiments, communicate with one another in order to provide the functionality of matching engine 12 described herein. In some embodiments, data store 30 may store data about signatures or other information. Cache server 32 may expedite access to this data by storing likely relevant data in relatively high-speed memory, for example, in random-access memory or a solid-state drive. Web server 28 may communicate with webpages and/or other sources of network information. API server 26 may serve data to various applications that process data related to electronic documents that include signatures, images of signatures, stored information related to signatures, and/or other data. The operation of these components 26, 28, and 30 may be coordinated by one or more processors 14, which may bidirectionally communicate with each of these components or direct the components to communicate with one another. Communication may occur by transmitting data between separate computing devices (e.g., via transmission control protocol/internet protocol (TCP/IP) communication over a network), by transmitting data between separate applications or processes on one computing device; or by passing values to and from functions, modules, or objects within an application or process, e.g., by reference or by value.

In some embodiments, the interaction with users facilitated by matching engine 12 (e.g., receiving requests to match signatures, outputting results, etc.) may occur via a web site or a native application viewed on a desktop computer, tablet, or a laptop of the user. And in some cases, such interaction occurs via a mobile website viewed on a smart phone, tablet, or other mobile user device, or via a special-purpose native application executing on a smart phone, tablet, or other mobile user device.

To illustrate an example of the environment in which matching engine 12 operates, the illustrated embodiment of FIG. 1 includes a number of components with which the matching engine 12 communicates: mobile user device(s) 34; a desk-top user device 38; and external resources 46. These devices communicate with matching engine 12 via a network 50, such as the Internet or the Internet in combination with various other networks, like local area networks, cellular networks, or personal area networks, internal organizational networks, and/or other networks.

Mobile user device(s) 34 may be smart phones, tablets, or other hand-held networked computing devices having a display, a user input device (e.g., buttons, keys, voice recognition, or a single or multi-touch touchscreen), memory (such as a tangible, machine-readable, non-transitory memory), a network interface, a portable energy source (e.g., a battery), and a processor (a term which, as used herein, includes one or more processors) coupled to each of these components. The memory of mobile user device(s) 34 may store instructions that when executed by the associated processor provide an operating system and various applications, including a web browser 42 or a native mobile application 40. Desk-top user device(s) 38 may also include a web browser 44, a native application 45, and/or other components. In addition, desktop user device(s) 38 may include a monitor; a keyboard; a mouse; memory; a processor; and a tangible, non-transitory, machine-readable memory storing instructions that when executed by the processor provide an operating system, the web browser, the native application, and/or other components. Native applications 40 and 45, and web browsers 42 and 44, in some embodiments, are operative to provide a graphical user interface that communicates with matching engine 12 and facilitates user interaction with data from the matching engine 12. Web browsers 42 and 44 may be configured to receive a website and/or other web based communications from matching engine 12 having data related to instructions (for example, instructions expressed in JavaScript™) that when executed by the browser (which is executed by the processor) cause mobile user device 34 and/or desktop user device 38 to communicate with matching engine 12 and facilitate user interaction with data from matching engine 12. Native applications 40 and 45, and web browsers 42 and 44, upon rendering a webpage and/or a graphical user interface from the matching engine 12, may generally be referred to as client applications of the matching engine 12, which in some embodiments may be referred to as a server. Embodiments, however, are not limited to client/server architectures, and matching engine 12, as illustrated, may include a variety of components other than those functioning primarily as a server.

External resources 46, in some embodiments, include sources of information such as databases, websites, etc.; external entities participating with system 10 (e.g., systems or networks that store signature data, electronic documents with signatures, and/or other information), one or more servers outside of the system 10, a network (e.g., the internet), electronic storage, equipment related to Wi-Fi™ technology, equipment related to Bluetooth® technology, data entry devices, or other resources. In some implementations, some or all of the functionality attributed herein to external resources 46 may be provided by resources included in system 10. External resources 46 may be configured to communicate with the matching engine 12, mobile user devices 34, desktop user devices 38, and/or other components of system 10 via wired and/or wireless connections, via a network (e.g., a local area network and/or the internet), via cellular technology, via Wi-Fi technology, and/or via other resources. The number of illustrated external resources 46, desktop user devices 38, and mobile user devices 34 is selected for explanatory purposes only, and embodiments are not limited to the specific number of any such devices illustrated by FIG. 1, which is not to imply that other descriptions are limiting.

Matching engine 12 includes a number of components introduced above that facilitate the signature match requests by users, other computing systems, and/or requests from other sources. For example, API server 26 may be configured to communicate data about signature match requests, results of those requests, and/or other information via a protocol, such as a representational-state-transfer (REST)-based API protocol over hypertext transfer protocol (HTTP) or other protocols. Examples of operations that may be facilitated by API server 26 include requests to display, link, modify, add, or retrieve portions of signature match requests and/or results of such requests, or other information. API requests may identify which data is to be displayed, linked, modified, added, or retrieved by specifying criteria for identifying records, such as queries for retrieving or processing information about a particular signature, signature match request, results from a particular signature match request, etc. In some embodiments, API server 26 communicates with the native applications 40 and 45 of mobile user device 34 and desktop user device 38, and/or other components of system 10.

Web server 28 may be configured to display, link, modify, add, or retrieve portions or all data related a particular signature, signature match request, results from a particular signature match request, and/or other information encoded in a webpage (e.g. a collection of resources to be rendered by the browser and associated plug-ins, including execution of scripts, such as JavaScript™, invoked by the webpage), or in a graphical user interface display, for example. In some embodiments, a graphical user interface presented by the webpage may include inputs by which the user may enter or select data, such as clickable or touchable display regions or display regions for text input. Such inputs may prompt the browser to request additional data from the web server 28 or transmit data to the web server 28, and the web server 28 may respond to such requests by obtaining the requested data and returning it to the user device or acting upon the transmitted data (e.g., storing posted data or executing posted commands). In some embodiments, the requests are for a new webpage or for data upon which client-side scripts will base changes in the webpage, such as XMLHttpRequest requests for data in a serialized format, e.g. JavaScript™ object notation (JSON) or extensible markup language (XML). The web server 28 may communicate with web browsers, such as web browser 42 or 44 executed by user devices 34 or 38. In some embodiments, the webpage is modified by the web server 28 based on the type of user device, e.g., with a mobile webpage having fewer and smaller images and a narrower width being presented to the mobile user device 34, and a larger, more content rich webpage being presented to the desk-top user device 38. An identifier of the type of user device, either mobile or non-mobile, for example, may be encoded in the request for the webpage by the web browser (e.g., as a user agent type in an HTTP header associated with a GET request), and the web server 28 may select the appropriate interface based on this embedded identifier, thereby providing an interface appropriately configured for the specific user device in use.

Data store 30 stores data related to signatures, signature match requests, results from signature match requests, documents that include signatures, etc. Data store 30 may include various types of data stores, including relational or non-relational databases, document collections, hierarchical key-value pairs, or memory images, for example. Such components may be formed in a single database, document, or other component, or may be stored in separate data structures. In some embodiments, data store 30 comprises electronic storage media that electronically stores information. The electronic storage media of data store 30 may include one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Data store 30 may be (in whole or in part) a separate component within the system 10, or data store 30 may be provided (in whole or in part) integrally with one or more other components of the system 10 (e.g., processors 14, etc.). In some embodiments, data store 30 may be located in a data center, in a server that is part of external resources 46, in a computing device 34 or 38, or in other locations. Data store 30 may include one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), or other electronically readable storage media. Data store 30 may store software algorithms, information determined by processor 14, information received via a graphical user interface displayed on computing devices 34 and/or 38, information received from external resources 46, or other information accessed by the system 10 to function as described herein.

Figure 7:
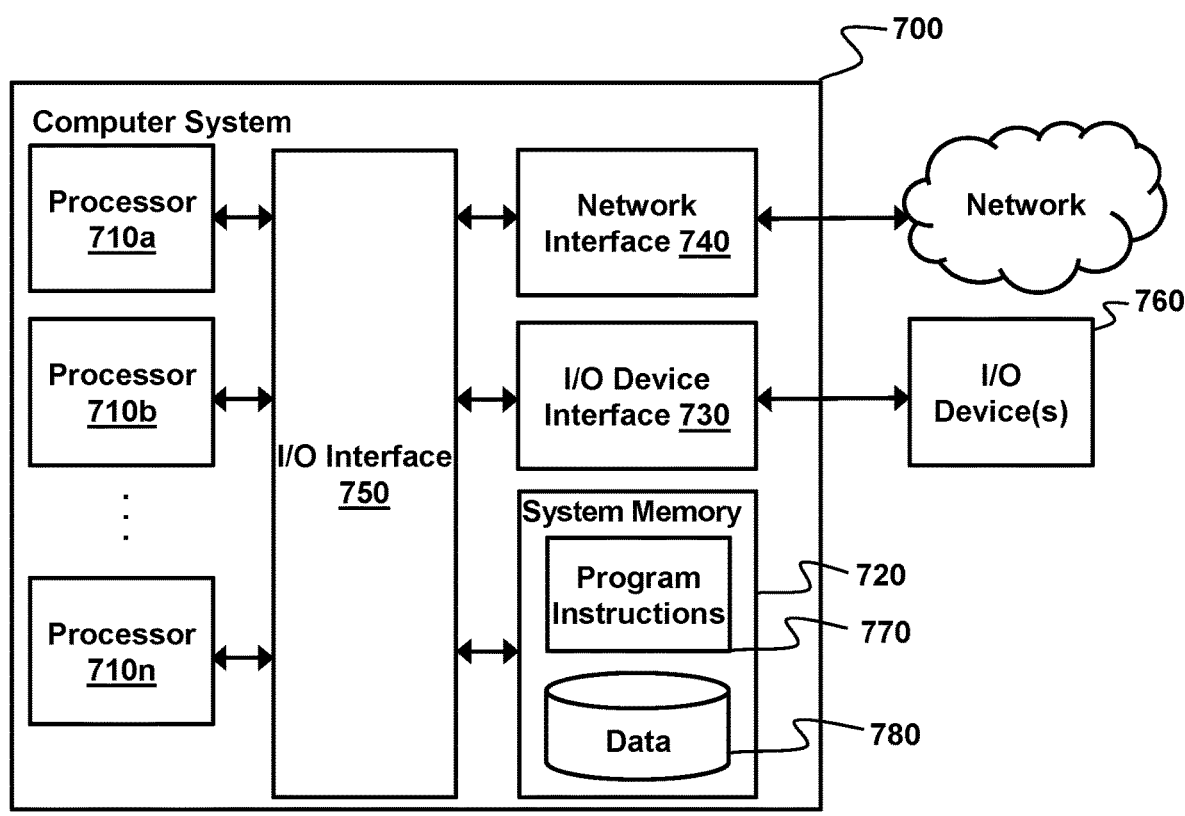
FIG. 7 is a diagram that illustrates an exemplary computing system in accordance with one or more embodiments.

FIG. 7 is a diagram that illustrates an exemplary computing system 700 in accordance with embodiments of the present system. Various portions of systems and methods described herein, may include or be executed on one or more computer systems the same as or similar to computing system 700. For example, matching engine 12, mobile user device 34, desktop user device 38, external resources 46 and/or other components of the system 10 (FIG. 1) may be and/or include one more computer systems the same as or similar to computing system 700. Further, processes, modules, processor components, and/or other components of system 10 described herein may be executed by one or more processing systems similar to and/or the same as that of computing system 700.

Computing system 700 may include one or more processors (e.g., processors 710a-710n) coupled to system memory 720, an input/output I/O device interface 730, and a network interface 740 via an input/output (I/O) interface 750. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computing system 700 may be a uni-processor system including one processor (e.g., processor 710a), or a multi-processor system including any number of suitable processors (e.g., 710a-710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 700 may include a plurality of computing devices (e.g., distributed computer systems) to implement various processing functions.

I/O device interface 730 may provide an interface for connection of one or more I/O devices 760 to computer system 700. I/O devices may include devices that receive input (e.g., from a user) or output information (e.g., to a user). I/O devices 760 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or other devices. I/O devices 760 may be connected to computer system 700 through a wired or wireless connection. I/O devices 760 may be connected to computer system 700 from a remote location. I/O devices 760 located on a remote computer system, for example, may be connected to computer system 700 via a network and network interface 740.

Network interface 740 may include a network adapter that provides for connection of computer system 700 to a network. Network interface may 740 may facilitate data exchange between computer system 700 and other devices connected to the network. Network interface 740 may support wired or wireless communication. The network may include an electronic communication network, such as the Internet, a local area network (LAN), a wide area network (WAN), a cellular communications network, or other networks.

System memory 720 may be configured to store program instructions 770 or data 780. Program instructions 770 may be executable by a processor (e.g., one or more of processors 710a-710n) to implement one or more embodiments of the present techniques. Instructions 770 may include modules and/or components (e.g., components 16-24 shown in FIG. 1) of computer program instructions for implementing one or more techniques described herein with regard to various processing modules and/or components. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 720 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or other memory. System memory 720 may include a non-transitory computer readable storage medium that may have program instructions stored thereon that are executable by a computer processor (e.g., one or more of processors 710*a*-710*n*) to cause the subject matter and the functional operations described herein. A memory (e.g., system memory 720) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 750 may be configured to coordinate I/O traffic between processors 710*a*-710*n*, system memory 720, network interface 740, I/O devices 760, and/or other peripheral devices. I/O interface 750 may perform protocol, timing, or other data transformations to convert data signals from one component (e.g., system memory 720) into a format suitable for use by another component (e.g., processors 710*a*-710*n*). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 700 or multiple computer systems 700 configured to host different portions or instances of embodiments. Multiple computer systems 700 may provide for parallel or sequential processing/execution of one or more portions of the techniques described herein.

Those skilled in the art will appreciate that computer system 700 is merely illustrative and is not intended to limit the scope of the techniques described herein. Computer system 700 may include any combination of devices or software that may perform or otherwise provide for the performance of the techniques described herein. For example, computer system 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a television or device connected to a television (e.g., Apple TV™), or a Global Positioning System (GPS), or other devices. Computer system 700 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

Figure 8:
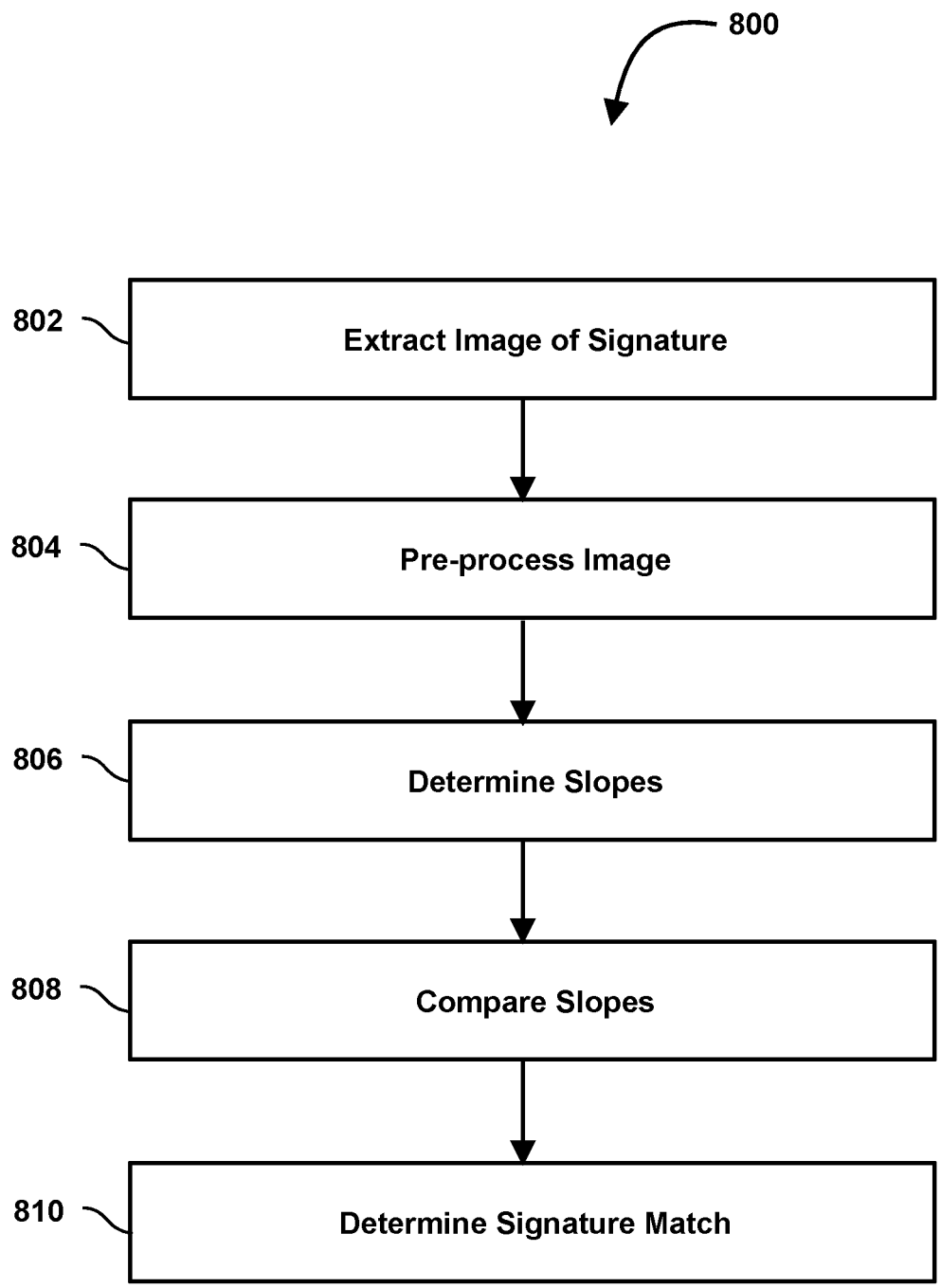
FIG. 8 illustrates a method for matching signatures with a signature matching system, in accordance with one or more embodiments.

FIG. 8 illustrates a method 800 for matching signatures with a signature matching system. The system comprises one or more processors configured by machine-readable instructions, and/or other components. The one or more processors are configured to execute computer program components. The computer program components comprise a request component, an extraction component, a pre-processing component, a comparison component, a match component, and/or other components. The operations of method 800 presented below are intended to be illustrative. In some embodiments, method 800 may be accomplished with one or more additional operations not described, and/or without one or more of the operations discussed. Additionally, the order in which the operations of method 800 are illustrated in FIG. 8 and described below is not intended to be limiting.

In some embodiments, method 800 may be implemented in one or more processing devices such as one or more processors 14 described herein (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

At an operation 802, an image of a signature is extracted. The image of the signature is an electronic image of the signature from an electronic document. In some embodiments, operation 802 is performed by a processor component the same as or similar to extraction component 18 (shown in FIG. 1 and described herein).

At an operation 804, the image of the signature is pre-processed. In some embodiments, the pre-processing comprises receiving a black and white electronic image of the signature, or converting a color electronic image of the signature to a black and white electronic image of the signature. The pre-processing comprises converting the black and white electronic image of the signature into a two dimensional binary matrix that stores a "1" in the matrix for a black pixel in the black and white electronic image and a "0" in the matrix for a white pixel in the black and white electronic image. The pre-processing comprises trimming the two dimensional binary matrix such that a left most "1" in the matrix is positioned on a left edge of the trimmed matrix, an upper most "1" in the matrix is positioned at an upper edge of the trimmed matrix, a right most "1" in the matrix is positioned at a right edge of the trimmed matrix, and a lower most "1" in the matrix is positioned at a lower edge of the trimmed matrix. The pre-processing comprises assigning Cartesian co-ordinates to the 1's and 0's in the trimmed matrix. In some embodiments, operation 804 is performed by a processor component the same as or similar to pre-processing component 20 (shown in FIG. 1 and described herein).

At an operation 806, slopes are determined. Operation 806 includes determining, using the extracted and pre-processed image of the signature, values of slopes of lines that bound the signature in the electronic image. The slopes of the lines that bound the signature in the electronic image comprise four slopes of four lines that form a quadrilateral that bounds the signature in the electronic image. Operation 806 includes determining the values of the four slopes of the four lines that bound the signature using the Cartesian co-ordinates. The four lines comprise a line between the left most "1" and the upper most "1", a line between the upper most "1" and the right most "1", a line between the right most "1" and the lower most "1", and a line between the lower most "1" and the left most "1" of the trimmed matrix. In some embodiments, operation 806 includes determining, using the extracted electronic image of the signature a ratio of a number of black pixels in the signature to a total number of pixels in the electronic image and a ratio of electronic image height to electronic image width.

In some embodiments, operation 806 includes storing the determined values of the slopes of the signature, the pixel ratio, the dimensional ratio, and/or other information in an object representing the electronic image of the signature. In some embodiments, operation 806 includes storing a unique identifier for the object, information related to the electronic document the electronic image of the signature was extracted from, metadata associated with the electronic image, information related to an image width, and information related to an image height in the object representing the electronic image of the signature. In some embodiments, operation 806 is performed by a processor component the same as or similar to comparison component 22 (shown in FIG. 1 and described herein).

At an operation 808, the determined slopes are compared to corresponding slopes of other signatures. Operation 808 includes comparing the values of the slopes of the lines that bound the signature in the electronic image to values of slopes of corresponding lines that bound other signatures stored in a signature database. In some embodiments, operation 808 includes comparing the value of the pixel ratio to pixel ratios of other signatures, and the dimensional ratio of the signature to dimensional ratios of other signatures stored in the signature database. In some embodiments, operation 808 is performed by a processor component the same as or similar to comparison component 22 (shown in FIG. 1 and described herein).

At an operation 810, a signature match is determined. Operation 810 includes determining whether the signature matches one or more of the other signatures based on the values of the slopes of the lines that bound the signature in the electronic image matching values of corresponding slopes of lines that bound one or more of the other signatures to within predetermined tolerances for the slopes. For example, the signature is matched to one or more of the other signatures responsive to the values of the four slopes of the signature matching values of four corresponding slopes of one or more of the other signatures to within predetermined tolerances for the four slopes. In some embodiments, at least one predetermined tolerance of the predetermined tolerances for the slopes is different than another tolerance such that a predetermined tolerance for a value of at least one slope is different than a predetermined tolerance for a value of another slope. In some embodiments, the predetermined tolerances for the values of individual slopes are independent of tolerances for values of other individual slopes and separately adjustable.

In some embodiments, the signature is determined to match one or more of the other signatures responsive to: the values of the slopes of the lines that bound the signature matching values of corresponding slopes of the lines that bound one or more of the other signatures to within predetermined tolerances for the slopes; the ratio of the number of black pixels in the signature to the total number of pixels in the electronic image matching corresponding pixel ratios of one or more of the other signatures to within a predetermined tolerance for the pixel ratio; and the ratio of electronic image height to electronic image width matching corresponding dimensional ratios of one or more of the other signatures to within a predetermined tolerance for the dimensional ratio. In some embodiments, operation 810 is performed by a processor component the same as or similar to match component 24 (shown in FIG. 1 and described herein).

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to cost constraints, some inventions disclosed herein may not be presently claimed and may be claimed in later filings, such as continuation applications or by amending the present claims.

Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and other terms, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and other similar statements (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or similar terms refer to actions or processes of a specific apparatus, such as a special purpose computer or a similar special purpose electronic processing/computing device.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A method for matching signatures comprising:
   extracting, with one or more processors of a signature matching system, an electronic image of a signature from an electronic document;
   responsive to extracting the electronic image of the signature from the electronic document, pre-processing the electronic image with the one or more processors of the signature matching system, the pre-processing comprising:
   receiving a black and white electronic image of the signature, or converting a color electronic image of the signature to a black and white electronic image of the signature;
   converting the black and white electronic image of the signature into a two dimensional binary matrix that stores a "1" in the matrix for a black pixel in the black and white electronic image and a "0" in the matrix for a white pixel in the black and white electronic image; and
   trimming the two dimensional binary matrix such that a left most "1" in the matrix is positioned on a left edge of the trimmed matrix, an upper most "1" in the matrix is positioned at an upper edge of the trimmed matrix, a right most "1" in the matrix is positioned at a right edge of the trimmed matrix, and a lower most "1" in the matrix is positioned at a lower edge of the trimmed matrix;
   determining, with the one or more processors of the signature matching system, using the extracted electronic image of the signature, values of slopes of lines that bound the signature in the electronic image, wherein determining the values of the slopes of the lines comprises assigning, with the one or more processors of the signature matching system, Cartesian co-ordinates to the 1's and 0's in the trimmed matrix and determining values of four slopes of four lines that bound the signature using the Cartesian co-ordinates, the four lines comprising a line between the left most "1" and the upper most "1", a line between the upper most "1" and the right most "1", a line between the right most "1" and the lower most "1", and a line between the lower most "1" and the left most "1" of the trimmed matrix;

comparing, with the one or more processors of the signature matching system, the values of the slopes of the lines that bound the signature in the electronic image to values of slopes of corresponding lines that bound other signatures stored in a signature database of the signature matching system; and determining, with the one or more processors of the signature matching system, whether the signature matches one or more of the other signatures based on the values of the slopes of the lines that bound the signature in the electronic image matching values of corresponding slopes of lines that bound one or more of the other signatures to within predetermined tolerances for the slopes.

2. The method of claim 1, wherein the slopes of the lines that bound the signature in the electronic image comprise four slopes of four lines that form a quadrilateral that bounds the signature in the electronic image.

3. The method of claim 2, wherein the signature is matched to one or more of the other signatures responsive to the values of the four slopes of the signature matching values of four corresponding slopes of one or more of the other signatures to within predetermined tolerances for the four slopes.

4. The method of claim 3, wherein at least one predetermined tolerance of the predetermined tolerances for the slopes is different than another tolerance such that a predetermined tolerance for a value of at least one slope is different than a predetermined tolerance for a value of another slope.

5. The method of claim 1, further comprising determining, with the one or more processors of the signature matching system, using the extracted electronic image of the signature:
 a ratio of a number of black pixels in the signature to a total number of pixels in the electronic image; and
 a ratio of electronic image height to electronic image width,
 and wherein the signature is determined to match one or more of the other signatures responsive to:
  the values of the slopes of the lines that bound the signature matching values of corresponding slopes of the lines that bound one or more of the other signatures to within predetermined tolerances for the slopes;
  the ratio of the number of black pixels in the signature to the total number of pixels in the electronic image matching corresponding pixel ratios of one or more of the other signatures to within a predetermined tolerance for the pixel ratio; and
  the ratio of electronic image height to electronic image width matching corresponding dimensional ratios of one or more of the other signatures to within a predetermined tolerance for the dimensional ratio.

6. The method of claim 1, further comprising storing, with the one or more processors of the signature matching system, the determined values of the slopes of the signature in an object representing the electronic image of the signature.

7. The method of claim 6, further comprising storing, with the one or more processors of the signature matching system, a unique identifier for the object, information related to the electronic document the electronic image of the signature was extracted from, metadata associated with the electronic image, information related to an image width, and information related to an image height in the object representing the electronic image of the signature.

8. The method of claim 1, wherein the predetermined tolerances for the values of individual slopes are independent of tolerances for values of other individual slopes and separately adjustable.

9. A tangible, non-transitory, machine-readable medium of a signature matching system storing instructions that when executed by one or more processors effectuate operations comprising:
 extracting an electronic image of a signature from an electronic document;
 responsive to extracting the electronic image of the signature from the electronic document, pre-processing the electronic image, the pre-processing comprising:
  receiving a black and white electronic image of the signature, or converting a color electronic image of the signature to a black and white electronic image of the signature;
  converting the black and white electronic image of the signature into a two dimensional binary matrix that stores a "1" in the matrix for a black pixel in the black and white electronic image and a "0" in the matrix for a white pixel in the black and white electronic image; and trimming the two dimensional binary matrix such that a left most "1" in the matrix is positioned on a left edge of the trimmed matrix, an upper most "1" in the matrix is positioned at an upper edge of the trimmed matrix, a right most "1" in the matrix is positioned at a right edge of the trimmed matrix, and a lower most "1" in the matrix is positioned at a lower edge of the trimmed matrix;
 determining, using the extracted electronic image of the signature, values of slopes of lines that bound the signature in the electronic image, wherein determining the values of the slopes of the lines comprises assigning, with the one or more processors of the signature matching system, Cartesian co-ordinates to the 1's and 0's in the trimmed matrix and determining values of four slopes of four lines that bound the signature using the Cartesian co-ordinates, the four lines comprising a line between the left most "1" and the upper most "1", a line between the upper most "1" and the right most "1", a line between the right most "1" and the lower most "1", and a line between the lower most "1" and the left most "1" of the trimmed matrix;
 comparing the values of the slopes of the lines that bound the signature in the electronic image to values of slopes of corresponding lines that bound other signatures stored in a signature database of the signature matching system; and
 determining whether the signature matches one or more of the other signatures based on the values of the slopes of the lines that bound the signature in the electronic image matching values of corresponding slopes of lines that bound one or more of the other signatures to within predetermined tolerances for the slopes.

10. The medium of claim 9, wherein the slopes of the lines that bound the signature in the electronic image comprise four slopes of four lines that form a quadrilateral that bounds the signature in the electronic image.

11. The medium of claim 10, wherein the signature is matched to one or more of the other signatures responsive to the values of the four slopes of the signature matching values of four corresponding slopes of one or more of the other signatures to within predetermined tolerances for the four slopes.

12. The medium of claim 11, wherein at least one predetermined tolerance of the predetermined tolerances for the slopes is different than another tolerance such that a predetermined tolerance for a value of at least one slope is different than a predetermined tolerance for a value of another slope.

13. The medium of claim 9, the operations further comprising determining, using the extracted electronic image of the signature:
   a ratio of a number of black pixels in the signature to a total number of pixels in the electronic image; and
   a ratio of electronic image height to electronic image width,
   wherein the signature is determined to match one or more of the other signatures responsive to:
      the values of the slopes of the lines that bound the signature matching values of corresponding slopes of the lines that bound one or more of the other signatures to within predetermined tolerances for the slopes;
      the ratio of the number of black pixels in the signature to the total number of pixels in the electronic image matching corresponding pixel ratios of one or more of the other signatures to within a predetermined tolerance for the pixel ratio; and
      the ratio of electronic image height to electronic image width matching corresponding dimensional ratios of one or more of the other signatures to within a predetermined tolerance for the dimensional ratio.

14. The medium of claim 9, the operations further comprising storing the determined values of the slopes of the signature in an object representing the electronic image of the signature.

15. The medium of claim 14, the operations further comprising storing a unique identifier for the object, information related to the electronic document the electronic image of the signature was extracted from, metadata associated with the electronic image, information related to an image width, and information related to an image height in the object representing the electronic image of the signature.

16. The medium of claim 9, wherein the predetermined tolerances for the values of individual slopes are independent of tolerances for values of other individual slopes and separately adjustable.

17. A system for matching signatures, the system comprising one or more processors configured by machine-readable instructions to:
   extract an electronic image of a signature from an electronic document;
   responsive to extracting the electronic image of the signature from the electronic document, pre-process the electronic image, the pre-processing comprising:
      receiving a black and white electronic image of the signature, or converting a color electronic image of the signature to a black and white electronic image of the signature;
      converting the black and white electronic image of the signature into a two dimensional binary matrix that stores a "1" in the matrix for a black pixel in the black and white electronic image and a "0" in the matrix for a white pixel in the black and white electronic image; and
      trimming the two dimensional binary matrix such that a left most "1" in the matrix is positioned on a left edge of the trimmed matrix, an upper most "1" in the matrix is positioned at an upper edge of the trimmed matrix, a right most "1" in the matrix is positioned at a right edge of the trimmed matrix, and a lower most "1" in the matrix is positioned at a lower edge of the trimmed matrix;
   determine, using the extracted electronic image of the signature, values of slopes of lines that bound the signature in the electronic image, wherein determining the values of the slopes of the lines comprises assigning Cartesian co-ordinates to the 1's and 0's in the trimmed matrix and determining values of four slopes of four lines that bound the signature using the Cartesian co-ordinates, the four lines comprising a line between the left most "1" and the upper most "1", a line between the upper most "1" and the right most "1", a line between the right most "1" and the lower most "1", and a line between the lower most "1" and the left most "1" of the trimmed matrix;
   compare the values of the slopes of the lines that bound the signature in the electronic image to values of slopes of corresponding lines that bound other signatures stored in a signature database of the signature matching system; and
   determine whether the signature matches one or more of the other signatures based on the values of the slopes of the lines that bound the signature in the electronic image matching values of corresponding slopes of lines that bound one or more of the other signatures to within predetermined tolerances for the slopes.

18. The system of claim 17, wherein the slopes of the lines that bound the signature in the electronic image comprise four slopes of four lines that form a quadrilateral that bounds the signature in the electronic image.

19. The system of claim 18, wherein the signature is matched to one or more of the other signatures responsive to the values of the four slopes of the signature matching values of four corresponding slopes of one or more of the other signatures to within predetermined tolerances for the four slopes.

20. The system of claim 17, wherein the one or more processors are further configured to determine, using the extracted electronic image of the signature:
   a ratio of a number of black pixels in the signature to a total number of pixels in the electronic image; and
   a ratio of electronic image height to electronic image width,
   wherein the signature is determined to match one or more of the other signatures responsive to:
      the values of the slopes of the lines that bound the signature matching values of corresponding slopes of the lines that bound one or more of the other signatures to within predetermined tolerances for the slopes;

the ratio of the number of black pixels in the signature to the total number of pixels in the electronic image matching corresponding pixel ratios of one or more of the other signatures to within a predetermined tolerance for the pixel ratio; and the ratio of electronic image height to electronic image width matching corresponding dimensional ratios of one or more of the other signatures to within a predetermined tolerance for the dimensional ratio.

* * * * *